May 27, 1924.                                                      1,495,264
G. SCHNEIDER
TIP AND VAMP GAUGE
Filed March 18, 1921
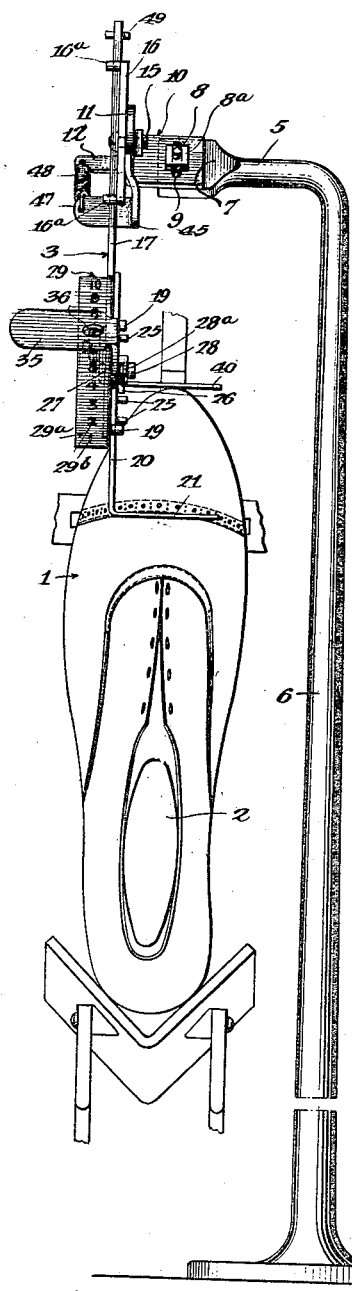
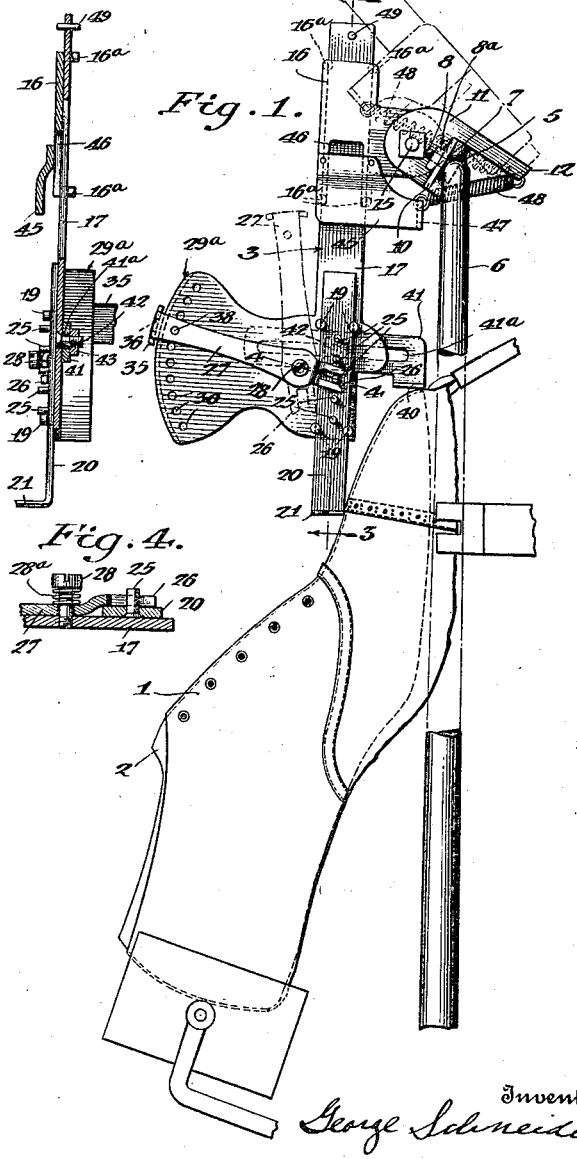
Inventor:
George Schneider
By Wood & Wood
Attorneys Patented May 27, 1924.

1,495,264

UNITED STATES PATENT OFFICE.

GEORGE SCHNEIDER, OF CINCINNATI, OHIO.

TIP AND VAMP GAUGE.

Application filed March 18, 1921. Serial No. 453,323.

*To all whom it may concern:*

Be it known that I, GEORGE SCHNEIDER, a citizen of the United States, and residing at Cincinnati, in the county of Hamilton and State of Ohio, have invented a new and useful Improvement in Tip and Vamp Gauges, of which the following specification is a full disclosure.

This invention relates to a tip and vamp gauge, designed to assist the workman in accurately measuring tip or vamp lengths, and in gauging said lengths relative to shoes of the same pair, and to shoes of similar style.

Heretofore, these measurements have been made by eye, and therefore inaccurately. My gauge enables the workman to duplicate standard measurements in pairs of shoes of the same style, the device being readily adjustable for varying lengths of tip and vamp.

My gauge is adapted for use in relation to a pulling-over machine wherein the assembled upper to be measured, is held in lasted and adjustable position. The gauge may, however, be used independently of that type of machine and such use is contemplated.

An object, therefore, of the invention is to provide means whereby the tip or vamp measurements of each shoe of a pair may be made to conform exactly to one another, and to other shoes of the same style.

Another object of the invention is the provision of a tip or vamp gauge, adapted to operate in juxtaposition to a shoe upper held by and adjustable in a pulling-over machine, the said gauge being mounted independently of said machine.

An additional object is the provision of a gauge, adjustable to and out of measuring position, and mounted between the operator and the front of the shoe upper.

Other objects are the provision of a direct reading dial, the readings of the same corresponding to the tip and vamp measurement of the various styles and sizes of shoes, and of substitute movable measuring tip arms or feet also corresponding to the various styles, sizes and fractional size of tips and vamps.

Other objects and certain advantages will be set forth in the description of the drawings forming a part of this specification, and reference is made to said drawings, in which:

Figure 1 is a side elevation showing my gauge positioned for tip measurement against the assembled upper of a shoe, said shoe being suitably and adjustably supported, as in a pulling-over machine.

Fig. 2 is an edge elevation of Fig. 1.

Fig. 3 is a section on line 3—3 of Fig. 1.

Fig. 4 is a detail section on line 4—4 of Fig. 1, illustrating the yieldable pivoting of the adjustment lever.

In the drawings the numeral 1 generally designates an assembled shoe upper, placed upon a last 2 and adjustably held in a pulling-over machine or in any suitable support, wherein the last and upper may be manipulated to adjust the tip or vamp of the said upper in conformity to the settings of my gauge.

Adjustably mounted upon an upper horizontal arm 5 of a suitable support 6, is my tip and vamp gauge, generally designated at 3. The support 6 is located as shown in a position which allows the gauge to be swung downwardly in a vertical plane against the shoe upper, and upwardly away from the same after a gauging operation. The support is moreover so placed that it does not interfere with the manipulation of the pulling-over machine or with any type of similar adjusting device. The outer end of the arm 5 is angularly disposed and flattened as at 7, and is provided with an outstanding screw-threaded pin 8, designed to engage an elongated adjusting slot 9, of an angle plate 10, having an attaching ear 11 at right angles thereto, said ear having a rearwardly and laterally extending spring attachment arm 12, integral therewith. A nut 8ª clamps the plate 10, to the arm 5 as shown.

Pivoted as at 15 to the ear 11, and designed in this instance to swing in a vertical plane, is a yoke or bearing plate 16 at the outer extremities of which are outstanding notched pins 16ª arranged to form guides for a sliding frame or base member 17, upon which are mounted adjustable gauge arms or members. As will be seen, the frame or base is slidable within the notches of the pins 16ª of the yoke 16, and as shown in dot-and-dash lines, the gauge as a whole, may be swung upwardly when not in use. Attached upon one side of and at the lower end of the frame 17 and slidable between the notched pins 19 of said frame, is a tip arm 20, having a right angular projection 21, adapted to engage the lower edge of the tip during the gauging operation. Suitably spaced and projecting laterally from the said tip arm 20, are a series of pins 25, each engageable conformably to tip length requirements, with the slot or fork 26, of an adjustment lever 27, yieldably pivoted as at 28 to and against a dial plate 29, projecting from and in the same plane with the frame 17.

The dial-plate 29 at its outer side is provided with an angularly disposed extension 29ª, concentric with the pivot 28, and with a series of openings 30, also concentric with said pivot, said openings being adjacent the outer periphery of said dial plate. The outer surface of the extension 29ª is suitably marked with size numbers 29ᵇ. The pivot 28 is in the form of a headed screw about which and between said head and said lever 27 is disposed a spring 28ª Fig. 4, which allows a yielding movement of the lever away from the face of the dial plate 29 for a purpose hereinafter described.

The outer end of the lever 27 is turned at right angles as at 35, to overlie the extension 29ª, to function as a finger-piece for operating the lever, an opening 36 being provided, through which a view of the size numbers 29ᵇ may be had. A pin 38 projects inwardly from the lever 27, and is adapted to engage the openings 30, corresponding with the said size numbers upon the extension 29ª.

By raising the lever about its pivot and against the action of the spring 28ª, and disengaging the pin 38 from its opening, the lever may be swung and the pin thereof engaged with any of the openings 30, to correspondingly lengthen or shorten the gauge measurement relative to the toe arm 40, said arm forming a part of the toe slide 41, adjustably mounted upon a pin 42, projecting from the side of the frame 17 opposite that to which the lever 27 is attached. The toe slide has engagement with said pin through its slot 41ª, and is clamped to adjusted position by the nut 43, said slide being disposed at right angles to the tip arm 20, as shown.

When it is desired to engage the slot or fork 26 with any one of the series of pins 25, the pin 38 is disengaged from its opening 30 by raising the lever against the action of the spring 28ª and said lever turned to a position shown in dot-and-dash lines at the middle of Fig. 1, after which the tip arm may be moved, to bring any one of the pins 25 to position for engagement with the said slot.

Extra tip arms 20 will be supplied, the pins 25 thereon being differently spaced relative to each other and to the pin spacing of other tip arms, so that every possible fractional measurement may be made conformably to tip and vamp style and size requirements.

Attached to the yoke or bearing plate 16 is an apron 45 designed to receive and house the upper end of the tip arm and pins 19 when the frame or base member is slid to its uppermost position, a slot 46 being provided in the plate 16 to receive the end of the tip arm under those conditions.

At the inner extremity of the apron 45 is an arm 47 at right angles thereto to which a spring 48 is attached, the opposite end of the same being attached to the arm 12, of the angle-plate 10. When the gauge is thrown upwardly, the spring acts to hold the device against downward displacement. the spring having passed over the center of the pivot 15. A stop-pin 49 limits the sliding movement of the yoke 16 in one direction.

In the operation of my gauge, the upper, properly positioned upon the last is placed in the pulling-over machine, or a device of similar function, after which, the tip arm 20 and toe slide 41 are relatively set, and the gauge, as a whole, lowered to gauging position, and the last manipulated to bring the tip or vamp in position corresponding to setting of said tip arm and toe slide.

The device is simple in operation and of great efficiency and accuracy.

Having described my invention, I claim:

1. In a tip and vamp gauge, a frame having a series of openings therein, adjustable gauge arms mounted upon said frame at right angles to one another, a pivoted lever engageable with one of said arms for oscillating that arm relative to the other, and a pin on said lever engageable with each opening of said series of openings in said frame.

2. In a tip and vamp gauge, a frame having a series of openings therein, adjustable gauge arms mounted thereon at right angles to each other, lateral extensions on each arm parallel with one another, a lever yieldably pivoted to and against said frame and engageable with one of said arms for oscillating that arm relative to the other, and a pin on said lever engageable with each opening of the said series of openings in said frame.

3. In a tip and vamp gauge, the combination with a support, and a shoe upper held adjacent said support, of a yoke pivotally attached to said support, a frame slidably attached to said yoke, said yoke and frame adapted to swing toward and away from said shoe upper, an arm slidably attached to said frame, a row of outstanding pins on said arm, a lever yieldably pivoted to and against said frame, and adapted for engagement with any one of said pins, a row of openings in said frame concentric with the pivot of said lever, a second adjustable arm attached to said frame and disposed at right angles to said first mentioned arm; and projectable beyond said frame, and a pin on said lever engageable with the openings in said frame.

4. In a tip and vamp gauge, a support, a yoke member, pivoted to said support, a frame slidable upon said yoke member, an arm slidably attached to said frame, having a right angular extension, an outstanding series of pins on said arm, a lever yieldably pivoted to said frame and having a slot therein capable of sliding engagement with any one of the pins of said arm, said arm having a sight opening therein, a series of openings in said frame concentric with the pivot of said lever, a set pin attached to said lever and engageable with any one of said series of openings, a second slotted arm adjustably attached to said frame in angular relation to said first mentioned arm, an extension on the said second arm parallel to the extension on the said first arm, and a dial plate on said frame having characters thereon readable through the sight opening in said lever.

5. In a tip and vamp gauge, a frame having a series of openings therein, adjustable measuring arms mounted thereon at right angles to one another, one of said arms having a pin thereon, a lever yieldably pivoted to and against said frame and engageable with said pin for oscillating that arm relative to the other, and a pin on said lever engageable with each of said series of openings in said frame.

6. In a tip and vamp gauge, a frame having a series of openings, adjustable gauge arms mounted thereon at opposite sides of said frame and at right angles to each other, lateral extensions on each arm, parallel with one another and lying in different planes, a lever yieldably pivoted to said frame, engageable with one of said arms for sliding that arm relative to the other, and a pin on said lever engageable with each opening of the series of openings in said frame.

7. In a tip and vamp gauge, a support, a yoke pivotally attached to said support, a frame slidably attached to said yoke, said frame having a series of openings therein, an arm slidably engaged with said frame, a row of outstanding pins on said arm, a lever yieldingly pivoted to and against said frame and having a fork at one of its ends engageable with any one of said pins, a second adjustable slotted arm disposed at right angles to said first mentioned arm and projectable beyond said frame, and a pin on the arm of said lever opposite that of the fork, engageable with the openings in said frame, said openings being concentric with the pivot of said lever.

8. In a tip and vamp gauge, a support, a yoke member pivotally attached to said support, a frame slidably mounted upon said yoke member, an arm having a right angular tip engaging extension and slidable against one face of said frame, an outstanding series of pins on said arm, a lever pivoted to and yieldably against said frame, said lever having a slot at one end and a sight opening at the opposite end, said slot engageable with any one of the series of pins, a series of openings in said frame concentric with the pivot of said lever, a set pin attached to said lever and engageable with any one of said series of openings, a second adjustable slotted arm attached in angular relation to said first mentioned arm, at the opposite side of said frame, a toe engaging extension on said second arm parallel with the tip engaging extension of said first mentioned arm, said frame having characters thereon readable through the opening in said lever.

9. A tip and vamp gauge, comprising a frame having a series of openings therein, angularly related independently adjustable gauge arms upon said frame, a lever pivoted to said frame and engageable with one of said arms for adjusting that arm relative to the other, and a pin upon said lever engageable with each opening of said series of openings.

10. In a tip and vamp gauge, a support, a yoke member pivoted to said support, a frame slidable in said yoke member, said frame having a series of openings therein, an arm having a right angular tip-engaging extension, said arm slidable against one face of said frame, an outstanding series of pins on said arm, a lever yieldably pivoted to said frame, said lever having a slot at one end and a sight opening at the opposite end, said slot engageable with any one of the series of pins, a set pin upon said lever engageable with any one of the series of said openings, a second adjustable arm angularly related to said first-mentioned arm and disposed at the opposite side of said frame, a toe-engaging extension on said second arm parallel with the tip-engaging extension of the first-mentioned arm, and characters on said frame readable through the sight opening of said lever, said characters indicative of degrees of movement of the lever-operated arm.

In witness whereof, I hereunto subscribe my name, as attested by the two subscribing witnesses.

GEORGE SCHNEIDER.

Witnesses:
L. A. BECK,
J. C. JUNIUS.